June 11, 1957 H. H. HAGAR 2,795,337
COLLAPSIBLE CLOTHESLINE DRYER
Filed May 11, 1956 5 Sheets-Sheet 1

INVENTOR:
HENRY H. HAGAR
BY Howson & Howson
ATTYS.

June 11, 1957 H. H. HAGAR 2,795,337
COLLAPSIBLE CLOTHESLINE DRYER
Filed May 11, 1956 5 Sheets-Sheet 2

INVENTOR:
HENRY H. HAGAR
BY Howson & Howson
ATTYS.

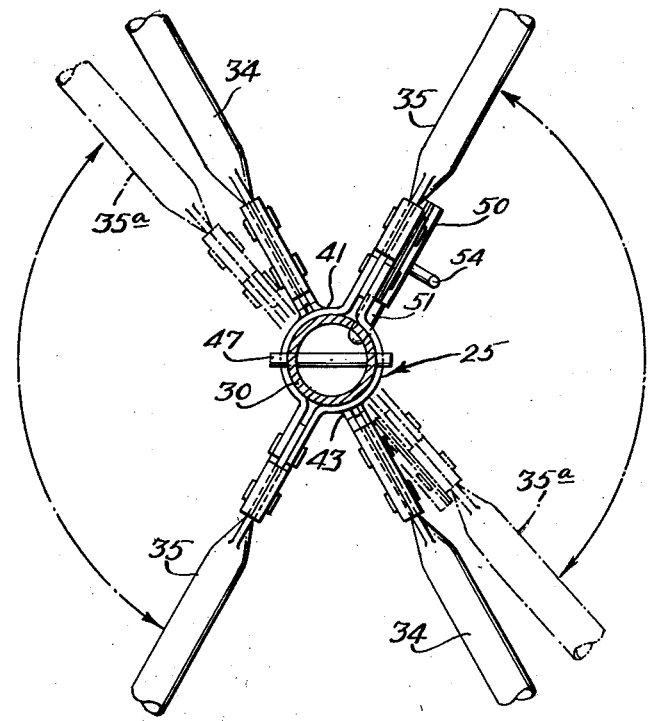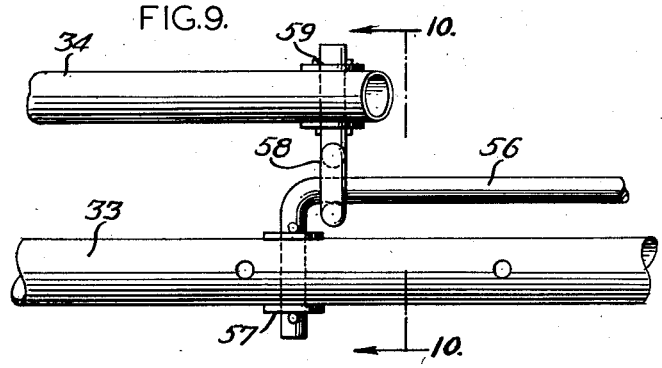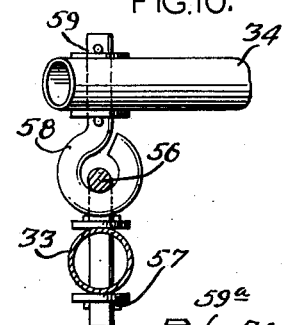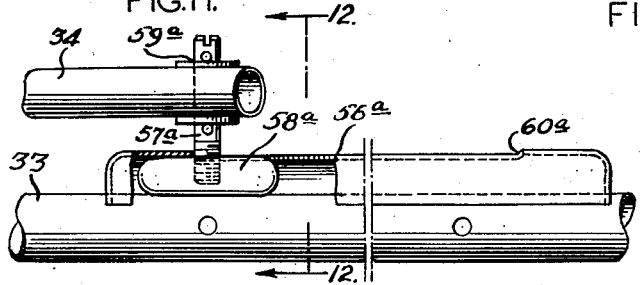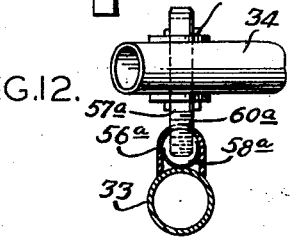

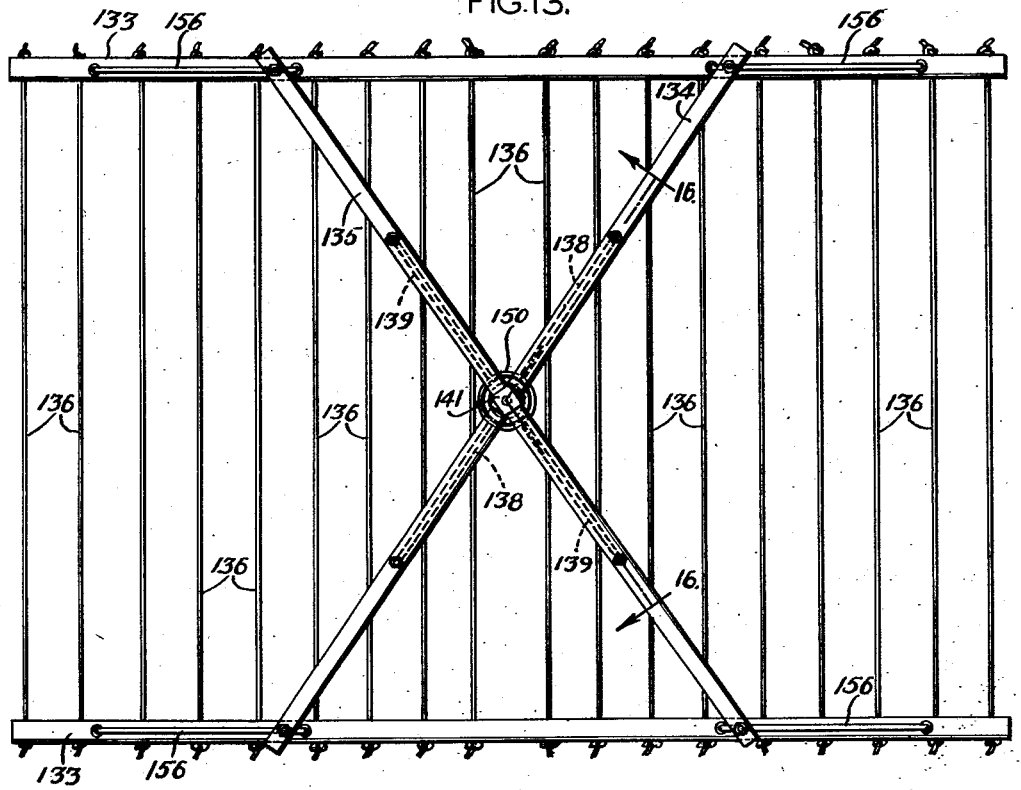
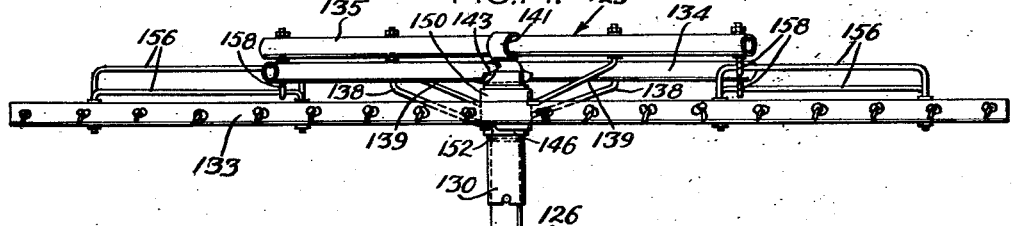
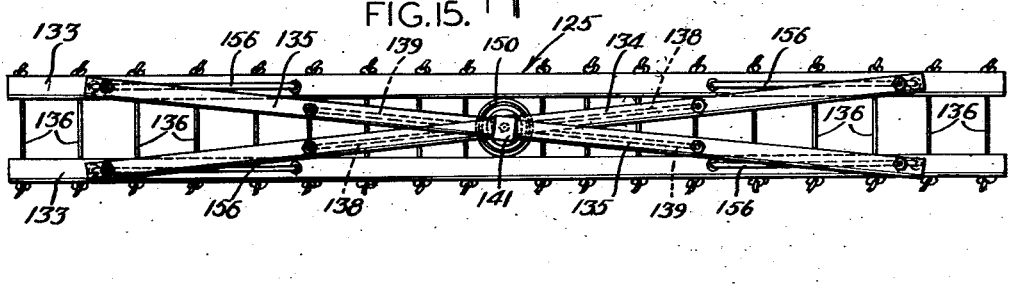

June 11, 1957  H. H. HAGAR  2,795,337
COLLAPSIBLE CLOTHESLINE DRYER
Filed May 11, 1956  5 Sheets-Sheet 5
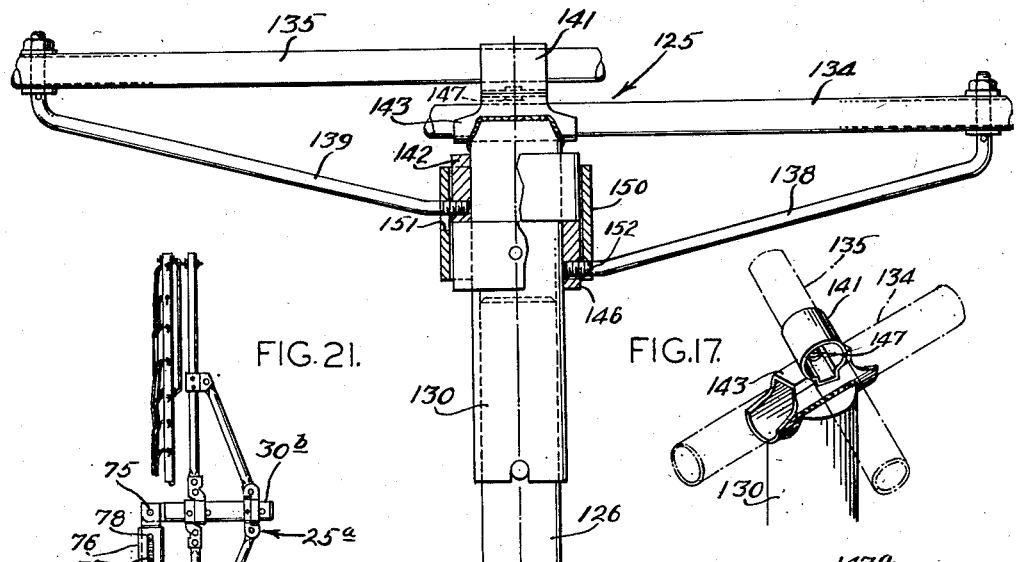
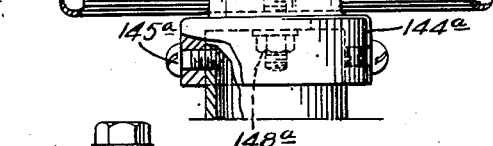
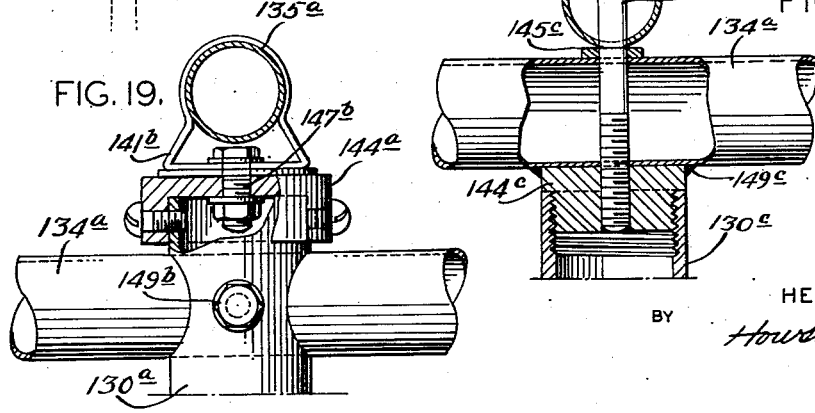
INVENTOR:
HENRY H. HAGAR
BY Howson & Howson
ATTYS.

2,795,337
COLLAPSIBLE CLOTHESLINE DRYER

Henry H. Hagar, Ambler, Pa.

Application May 11, 1956, Serial No. 584,247

15 Claims. (Cl. 211—178)

The present invention relates to new and useful improvements in clothesline dryers of the collapsible type, and more particularly to dryers in which the clotheslines are parallel and are stretched horizontally between spaced parallel hangers, as distinguished from the umbrella-type dryer wherein the clotheslines are carried directly on arms projecting radially from a central supporting pole.

Parallel line clothes dryers have been manufactured in which the hangers comprise folded sections which are collapsible into parallel relation with the pole. Other clothes dryers have been produced which comprise rigid unitary hangers which swing about their centers to collapse into parallel relation with the supporting pole. In each of the conventional types, complicated mechanical connections are necessary to provide the desired collapsing motion, and not infrequently, the connections are damaged when subjected to rough handling.

The present invention provides a clothesline dryer which is highly economical to manufacture, and is fully effective in operation and use.

Another object of the present invention is to provide a clothesline dryer which is readily collapsed into a compact package, but does not require complex mechanical connections which are subject to damage.

All of the objects and the various features and details of the construction and operation of the present invention are hereinafter more fully set forth with reference to the accompanying drawings wherein:

Fig. 8 is an enlarged sectional view taken on the line 8—8 of Fig. 2;

Fig. 9 is an enlarged fragmentary view illustrating the connection between the radial arm and the hanger;

Fig. 10 is a sectional view taken on the line 10—10 of Fig. 9;

Fig. 11 is a view similar to Fig. 9 of a modified form of connection;

Fig. 12 is a sectional view taken on the line 12—12 of Fig. 11;

Fig. 13 is a plan view similar to Fig. 1 showing a modification within the scope of the present invention;

Fig. 14 is a side elevational view of the device shown in Fig. 13;

Fig. 15 is a plan view of the device shown in Fig. 13 in collapsed position;

Fig. 16 is an enlarged sectional view taken on the line 16—16 of Fig. 13;

Fig. 17 is a perspective view showing the connection of the arms to the supporting pole;

Figs. 18 to 20 inclusive are fragmentary views respectively showing modifications in the connections between the arms and the supporting pole; and, Fig. 21 is a thumbnail sketch showing a modified construction enabling further collapse of the dryer.

The dryer of the present invention comprises a pair of parallel hangers between which a plurality of clotheslines are stretched. The hangers are held in position by four arm portions which extend radially from a center post or pole and are mounted for swinging pivotal movement in horizontal planes. A sliding connection is provided between the outer end of each arm portion and the hanger so that when the arm portions are swung about the pole, the hangers are free to move toward one another to positions closely adjacent the pole at opposite sides thereof. The dryer head comprising the arm portions, hangers, and clotheslines is demountably secured to the upper end of the pole so that the head may be removed from the pole for storing the head and pole in a compact package.

Figure 4:
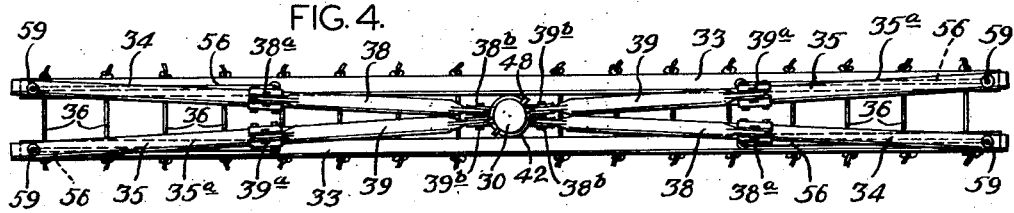
Fig. 4 is a plan view of the dryer in collapsed position.
Figure 5:
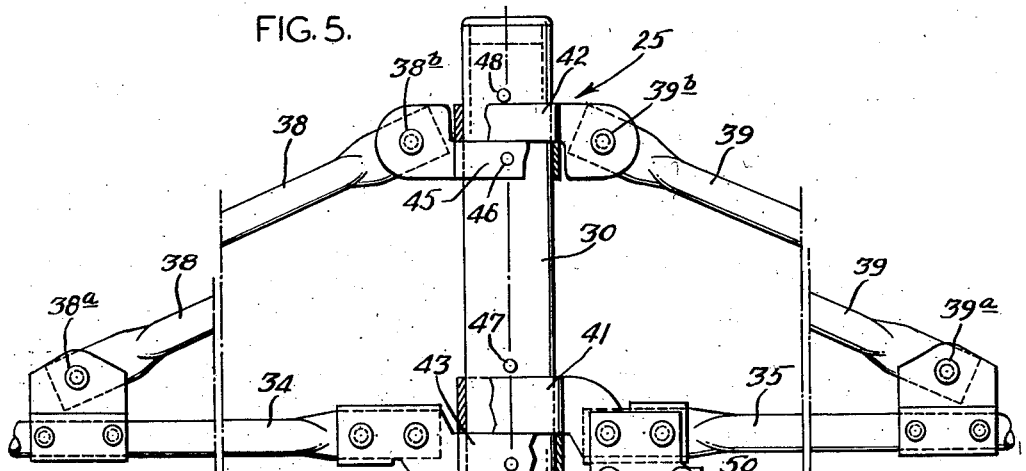
Fig. 5 is an enlarged sectional view taken on the line 5—5 of Fig. 1.
Figures 6, 7:
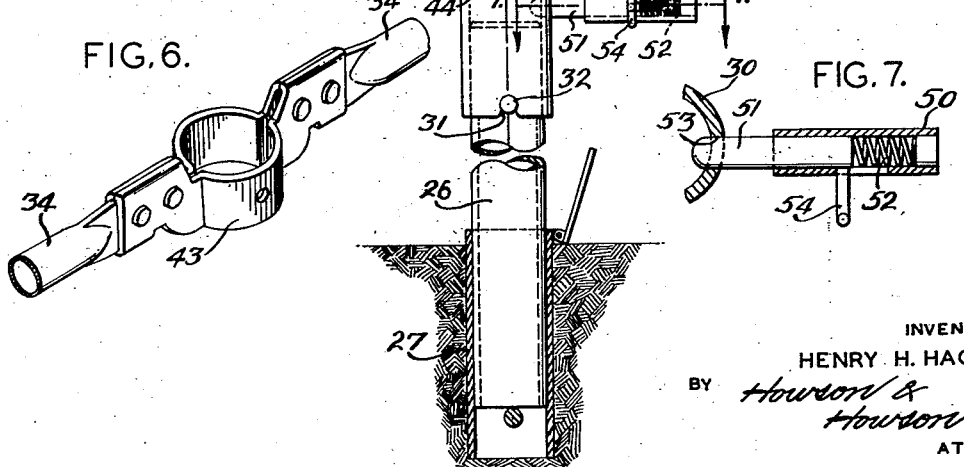
Fig. 6 is a detached perspective view of a mounting means for the radial supporting arms of the dryer.
Fig. 7 is an enlarged sectional view taken on the line 7—7 of Fig. 5.

Referring now to the drawings and more particularly to the form of the invention illustrated in Figs. 1 to 10 thereof, a dryer head 25 is mounted at the upper extremity of the pole 26 which is operable to be mounted in a ground socket 27 (see Fig. 5). The dryer head 25 in the present instance comprises a hollow post 30 operable to be telescopically engaged over the upper extremity of the supporting pole 26 and having adjacent its lower extremity a notch 31 for receiving a locking pin 32 projecting outwardly from the pole 26 to prevent relative rotation between the post 30 and the pole 26. The notch 31 is biased into engagement with the pin 32 by the weight of the dryer head 25.

Figure 1:
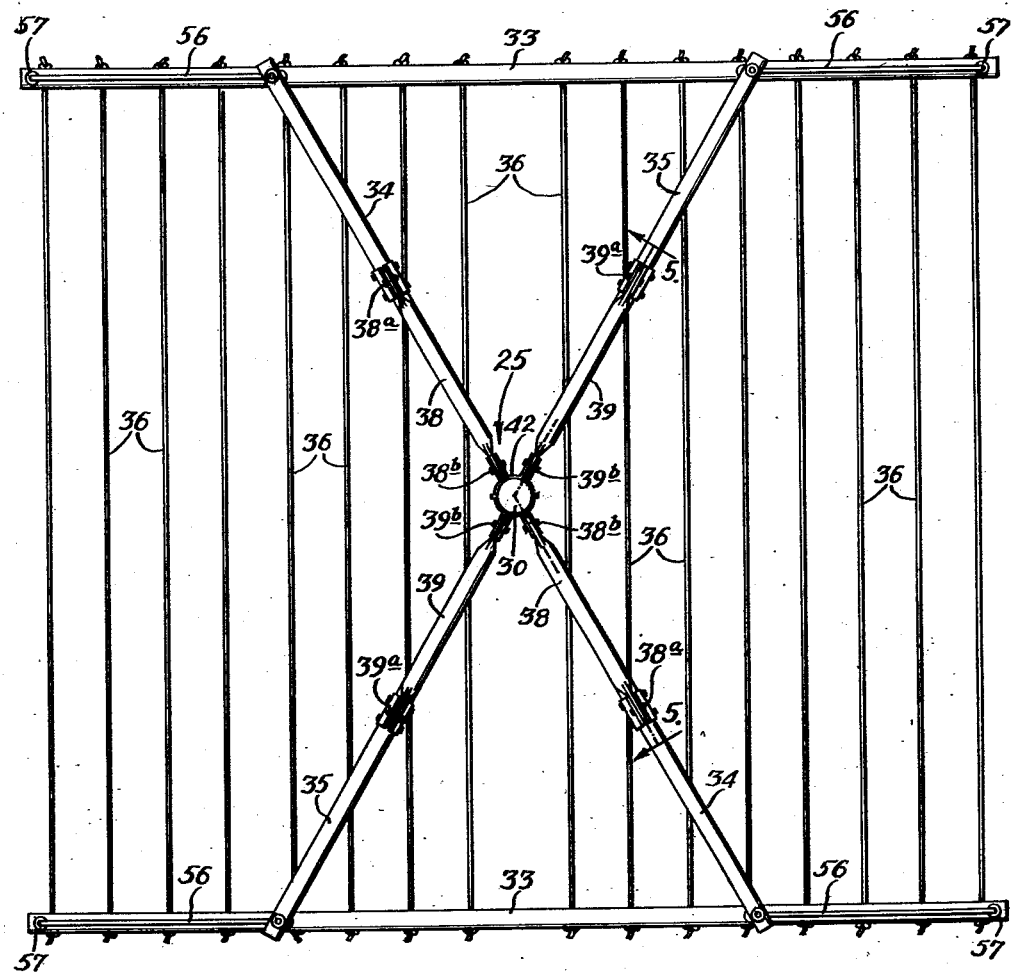
Fig. 1 is a plan view of a dryer made in accordance with the present invention in extended position.
Figure 2:
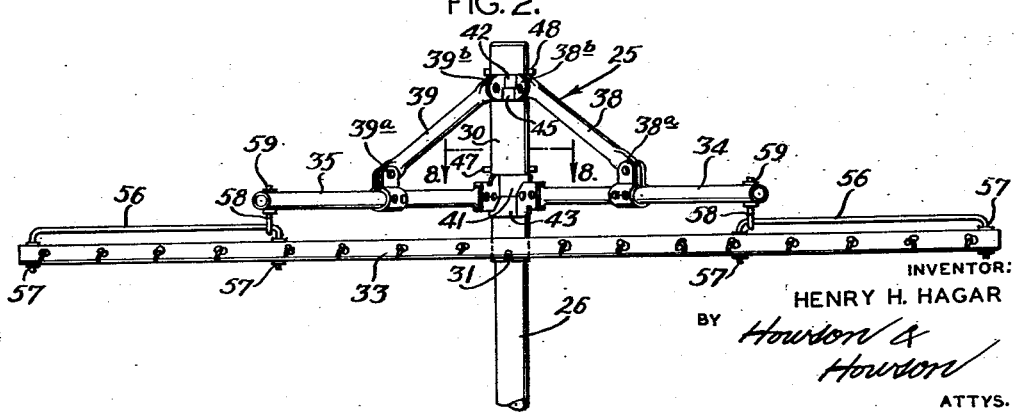
Fig. 2 is a side elevation of the dryer shown in Fig. 1.
Figure 3:
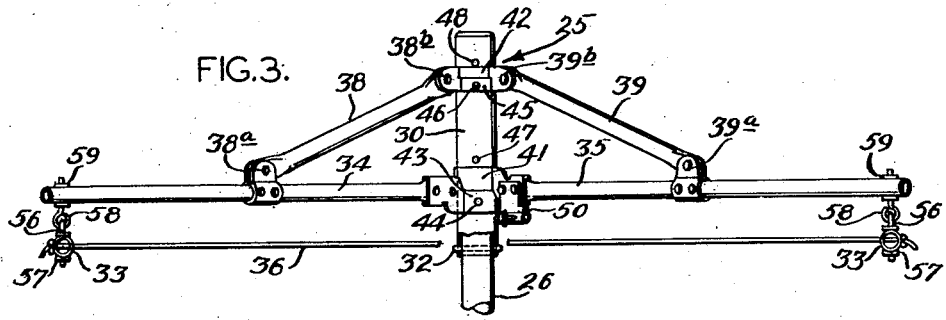
Fig. 3 is an end elevation of the dryer.

The post 30 of the dryer head supports a pair of spaced parallel hangers 33, 33 by means of arms 34, 34 and 35, 35. When the dryer is set up for use, as shown in Fig. 1, the hangers 33, 33 assume the spaced-apart relationship shown, so as to stretch between them a plurality of strands of clothesline 36. Preferably, the hangers 33 are tubular in form and are provided with apertures through which the strands 36 of the clotheslines pass. In the collapsed position of the dryer (see Fig. 4), the hangers 33, 33 are displaced toward one another as shown, the arms 35 assuming the position indicated at 35a in Figs. 4 and 8. In this position of the dryer, the strands 36 hang in depending loops between the hangers 33, 33. To increase the structural rigidity of the arms 34 and 35, struts 38 and 39 respectively are secured to the arms as indicated at 38a and 39a and are mounted on the post 30 as indicated at 38b and 39b.

In accordance with the invention, to afford collapse of the dryer head from the position shown in Fig. 1 to the position shown in Fig. 4, the arms 35, 35 are mounted for rotation on the post 30 in the horizontal plane containing the arms, and the arms 34, 34 are rigidly mounted on the post 30. To this end, the arms 35 are mounted on a collar 41 which is free to rotate on the post 30. Likewise, the mounting 39b for the strut 39 comprises a collar 42 also rotatably mounted on the post 30. The arm 34, on the other hand, is mounted on the post 30 by means of a collar 43 which is fixed to the post 30, for example by a stud 44. In a similar manner, the mounting 38b for the strut 38 comprises a collar 45 fixed to the post as indicated at 46. Thus, the collars 41 and 43 turn relative to one another, as do the collars 42 and 45. The fixed collars prevent downward displacement of the movable collars on the post 30 and pins are provided at 47 and 48 to prevent upward displacement of the movable collars 41 and 42 respectively. Thus, the arms 34 and 35 are movable between the open or extended position shown in full lines in Fig. 8 and the closed or collapsed position shown in broken lines. During the movement of the arms 35, 35 between the extended and collapsed positions, the free extremities of the arms describe an arc disposed in the horizontal plane containing the extremities of the arms 34, 34. The hangers 33, 33 are thereby maintained parallel to one another and to the ground during the extension and collapse of the dryer.

Means is provided to lock the arms 35 in the extended position. To this end, the movable collar 41 is provided with a latch housing 50 depending downwardly therefrom and housing a latch pin 51. A spring 52 is compressed between the pin 51, and the housing 50 to bias the pin 51 inwardly against the post 30. An aperture 53 is provided in the post 30 to register with the pin 51 when the arm 35 is in its extended position, and a latch operator 54 is provided to displace the latch pin 51 out of engagement with the aperture 53 when it is desired to collapse the dryer head. When extending the dryer, the arms 35 are pivoted on the post 30, the latch pin 51 riding on the outer surface of the post. When the arms 35 attain their extended position, the latch pin 51 falls into the aperture 53 to lock the arms in the extended position. If desired, a similar aperture may be provided in the post to register with the pin 51 when the arms 35 assume their collapsed position.

In accordance with the invention, to afford displacement of the hangers 33, 33 between the collapsed and extended position, sliding connections are provided between the outer extremity of the arms 34 and 35 and the hangers. As shown in Figs. 9 and 10, the hangers 33 are provided with elongated guides 56 which take the form of rods secured to the hangers as indicated at 57, 57. Slides are provided on the arms 34 and 35 to slidably engage the guides and support the hangers 33. In the present instance, the slides comprise an eyelet 58 pivotally secured to the arm as indicated at 59 and slidable on the guide 56 as shown in Figs. 9 and 10. As shown in Fig. 1, when the arms 34 and 35 are in the extended position, the slides 58 are disposed adjacent the inner extremity of the guides 56. On the other hand, when the arms 34 and 35 are collapsed, as shown in Fig. 4, the slides 58 are disposed adjacent the outer extremity of the guides 56. By this construction, the hangers 33, 33 are maintained in parallelism with one another and with the ground during adjustment of the arms between the extended and collapsed positions.

In accordance with the invention, the dryer is capable of being stored in a compact package. To this end, the dryer head 25 may be collapsed, as described above, and then separated from the pole 26 by simple upward displacement. The pole may then be stored parallel with the hangers 33, 33 to provide a compact package.

The invention is not limited to the specific structure illustrated in Figs. 1 to 10 inclusive. For example, the slide 58 and guide 56 may be replaced by a slide plug 58a having a shank 57a pivotally mounted on the arm as indicated at 59a in Figs. 11 and 12. A hollow guide 56a is mounted on the hanger 33, for example by welding or brazing. The guide 56a slidably receives the plug 58a and is slotted as indicated at 60a to receive the shank 57a and effect the sliding connection. The operation of the slides 58a and guides 56a is identical to the operation of the guides 58 and slides 56.

Other modifications within the scope of the present invention are illustrated in Figs. 13 to 21 inclusive. Figs. 13 to 17 inclusive illustrate a dryer comprising a dryer head 125 mounted on a pole 126 by a telescoping joint similar to the joint between the head 25 and the pole 26. The dryer head 125, as shown in Figs. 13 to 15 comprises spaced parallel hangers 133, 133 mounted on arms 134 and 135 by slides 158 and guides 156 similar to the slides and guides 58 and 56 respectively. Clotheslines 136 are stretched between the hangers 133, 133 as shown in Fig. 13. Struts 138, 138 are mounted at one end on the arm 134 and at the other end on a collar 146 fixed to a central post 130 of the dryer head. Likewise, struts 139, 139 are secured at one end to the arm 135 and at the other end to a collar 142 which is rotatable on the post 130.

In accordance with the invention, the arm 135 is rotatably mounted relative to the arm 134 to afford movement of the arm between the extended position shown in Fig. 13 and the collapsed position indicated in Fig. 15. The arm 134 is continuous between the hangers 133, 133 and is rigidly mounted on the post 130 by means of a saddle member 143 welded or otherwise secured to the upper end of the post. The arm 135 likewise extends continuously between the hangers 133, 133 and is mounted in a movable saddle 141 which is pivoted to the saddle 143 coaxially with the post 130 as indicated at 147. Thus, as the arm is swung between the extended and collapsed positions, the saddle 141 pivots on the saddle 143, and the collar 142 rotates on the post 130.

Means is provided to lock the arms 134 and 135 in the extended position. To this end, a bushing 150 is fitted over the collars 142 and 146. The bushing is provided with vertically elongated apertures at 151 to afford passage of the strut 139 through the bushing into engagement with the collar 142. Likewise, notches 152 are provided about the bottom periphery of the bushing 150 to receive the inner extremity of the struts 138. When the arm 135 is in the extended position, the notch 152 registers with the strut 138 and prevents relative rotation between the struts 138 and 139, consequently, the arms 134 and 135. To collapse the dryer head, the bushing is displaced upwardly, the strut 139 traveling in the elongated slot 151 and the strut 138 disengaging the slot 152. Upon upward displacement of the bushing 150, the arms 134 and 135 are free to be collapsed, the lower edge of the bushing 150 resting on the strut 138. When the arms are extended, the bushing travels on the struts 138 until the notches 152 register with the struts, at which point the bushing drops into place and locks the head against collapse. Thus, the bushing 158 operates similarly to the latch 50 of the previously described embodiment. If desired, a second notch may be provided to lock the dryer head in collapsed position.

As shown in Fig. 18, the saddles 141 and 143 may be replaced by saddle blocks 141a and 143a. The blocks 143a are rigidly mounted on the pole by a rigid connection to a cap 144a secured to the upper extremity of the pole as indicated at 145a. Relative pivotal movement between the arms 134a and 135a is afforded by a threaded pivot pin 147a passing through the blocks and arms and secured to the cap 144a as indicated at 148a. If desired, the arm 134a may be mounted directly in the post 130a and secured as indicated in Fig. 19, for example by a stud 149b. Thus, the cap 144a may pivotally mount the arm 135a by means of a saddle 141b pivoted to the cap 144a as indicated at 147b. A further modification may be made by threading a cap 144c to the upper extremity of the post 130c of the dryer head, welding the arm 134a to the cap as indicated at 149c and pivoting the arm 135a to the arm 134a by means of a threaded stud 147c, a suitable bearing being provided at 145c.

It may be desired to have an elongated post on the dryer head. As shown in Fig. 21, a dryer head 25a similar to the head 25 is formed with a folded post having sections 30a and 30b. The section 30b mounts the structure of the head 25a as shown, and the section 30a telescopically engages the supporting pole 26a in a manner similar to the telescopic engagement of the post 30 with the pole 26. The post sections 30a and 30b are pivotally connected as indicated at 75, and a ferrule or bushing 76 is operable to telescopically engage over the pivoted joint at 75 when the dryer head is set up for extension and the post sections 30a and 30b are in vertical alignment. To retain the ferrule 76 in position, an L-shaped slot 77 is provided in the wall of the ferrule to receive an outwardly projecting pin 78 mounted in the post section 30a. Thus, when the post sections 30a and 30b are in alignment, the ferrule 76 may be displaced upwardly, the pin 78 traveling in the slot 77. When the ferrule is in its upper limit position, it is rotated on the pole to lodge the pin 78 in the offset portion 79 of the slot; thereby locking the ferrule in position. The arms of the head are then extended, as described above in connection with Figs. 1 to 10 inclusive, and the dryer is set up for use. To collapse the dryer, the arms of the head 25a are collapsed, the ferrule 76 is rotated and displaced downwardly, the sections 30a and 30b are folded, and the head 25a is disengaged from the pole 26a to provide a compact package for storing.

While several embodiments of the invention have been herein illustrated and described, it is not intended to limit the invention of such disclosure, but further changes and modifications may be made therein and thereto within the scope of the following claims.

I claim:

1. In a collapsible clothesline dryer having a central post adapted to be mounted in vertical position, and a pair of elongated rigid unitary clothesline hangers adapted in the set up position of the dryer to be horizontally disposed in spaced apart relation at opposite sides of the central post and in the collapsed position of the dryer to be horizontally disposed closely adjacent said post at opposite sides thereof; a supporting structure for said hangers for moving the same between said set up and collapsed positions of the dryer comprising two pairs of arm portions extending crosswise of each other and mounted on said post at their juncture for relative pivotal movement about the vertical axis of said post, means slidably mounting the outer ends of each pair of said arm portions to the respective diagonally opposite end portions of said pair of hangers whereby said dryer may be collapsed and extended by relatively pivoting said pairs of arm portions on said post, the sliding connections at the outer extremities of said arm portions maintaining said hangers horizontal and parallel during said relative pivotal movement.

2. A dryer according to claim 1 wherein one of said pairs of arm portions is fixedly mounted on said post and wherein further said other pair of arm portions is movably mounted at a fixed point on said post for pivotal movement about the axis of said post.

3. A dryer according to claim 2 including latch means mounted on at least one of said movable arm portions and engageable with said post to retain said movable arm portions in their extended position.

4. A dryer according to claim 1 wherein said means slidably mounting said arm portions to said hangers comprises a guide member mounted on each hanger at each end thereof in parallel relation thereto, and a slide member mounted on the outer extremity of each arm portion and engageable with said guide for sliding movement longitudinally of said hanger.

5. A dryer according to claim 4 wherein said guide is rigidly mounted on said hanger and wherein further said slide is pivotally mounted for pivotal movement on a vertical axis through said arm portion.

6. A dryer according to claim 1 wherein said pivotal mounting of said pairs of arm portions comprises means rigidly mounting one of said pairs of arm portions on said post, a collar rotatably mounted on said post, stop means above and below said collar to prevent vertical movement thereof, and means rigidly connecting the other pair of arm portions to said collar at diagonally opposite points thereon.

7. A dryer according to claim 1 wherein said arm portions are horizontal and each pair of arm portions is integrally formed to constitute a single arm extending from one of said hangers to the other.

8. A dryer according to claim 7 wherein one of said arms is rigidly mounted on said post, and including a saddle mounting the other of said arms, and pivot pin means coaxial with said post pivotally mounting said saddle to afford relative pivotal movement of said arms.

9. A dryer according to claim 1 wherein said post comprises two articulated sections hingedly connected at a point below said arm portions, and wherein further said post includes a tubular bushing slidable thereon and operable in one position to embrace said hinge and lock the articulated sections of said post in alignment, and in a second position to embrace only one of said sections to afford hinged movement of said two sections of the post.

10. A dryer according to claim 9 including latching means to retain said bushing in its first position.

11. Apparatus according to claim 1 wherein said post comprises a pole adapted to be mounted in a vertical position, and a tubular section telescopically mounted on the upper end of said pole for releasable engagement therewith, and wherein further said tubular section mounts said pairs of arm portions.

12. A dryer according to claim 11 including means to prevent relative rotation between said pole and said tubular portion when telescopically mounted.

13. In a collapsible clothesline dryer having a central post adapted to be mounted in vertical position, and a pair of elongated rigid unitary clothesline hangers adapted in the set up position of the dryer to be horizontally disposed in spaced apart relation at opposite sides of the central post and in the collapsed position of the dryer to be horizontally disposed closely adjacent said post at opposite sides thereof; a supporting structure for said hangers for moving the same between said set up and collapsed positions of the dryer comprising two pairs of arm portions extending crosswise of each other and mounted on said post at their juncture for relative pivotal movement about the vertical axis of said post, the first of said pairs of arm portions being rigidly mounted on said post at a first fixed point, and the second of said pairs of arms being pivotally mounted on said post adjacent said first fixed point, a first pair of struts, each strut of said pair being mounted at one end on one of said first arm portions and fixedly mounted at its opposite end at a second fixed point on said post, a second pair of struts, each strut of said second pair being mounted at one end to one of said second arm portions and mounted at its opposite end for pivotal movement about the vertical axis of said post adjacent said second fixed point thereon, means slidably mounting the outer ends of each pair of arm portions to the respective diagonally opposite end portions of said pair of hangers whereby said dryer may be collapsed and extended by relatively pivoting said pairs of arm portions on said post, the sliding connections at the outer extremities of said arm portions maintaining said hangers horizontal and parallel during said relative pivotal movement.

14. A dryer according to claim 13 including a fixed collar at said second fixed point on said post fixedly mounting the opposite ends of said first pair of struts, and a movable collar adjacent said fixed collar mounted for pivotal movement about the vertical axis of said post and mounting the opposite ends of said second pair of struts.

15. A dryer according to claim 14 including latch means to retain said arm portions in their extended position comprising a bushing slidably mounted on said movable collar for displacement between upper and lower limit positions, and means on said bushing operable in the lower limit position thereof to engage at least one of said first pair of fixed struts to prevent pivotal movement of said bushing and said movable collar in the extended position of said arm portions.

References Cited in the file of this patent

UNITED STATES PATENTS

| | | |
|---|---|---|
| 449,383 | Rathbun | Mar. 31, 1891 |
| 704,397 | Sullivan | July 8, 1902 |
| 955,576 | Bird | Apr. 19, 1910 |
| 2,327,232 | Wheeler | Aug. 17, 1943 |
| 2,644,592 | Campion | July 7, 1953 |
| 2,670,855 | Pierie | Mar. 2, 1954 |
| 2,699,911 | Chase et al. | Jan. 18, 1955 |
| 2,772,901 | Roethel | Dec. 4, 1956 |